United States Patent [19]

Beezer et al.

[11] Patent Number: 4,799,405
[45] Date of Patent: Jan. 24, 1989

[54] ASSEMBLY MACHINE CHASSIS

[76] Inventors: William E. Beezer, 73 N. Bayard La.; Earl F. Beezer, 24 Macoun Dr., both of Mahwah, N.J. 07430

[21] Appl. No.: 36,116
[22] Filed: Apr. 9, 1987
[51] Int. Cl.$^4$ .............................................. B23P 15/26
[52] U.S. Cl. ...................................................... 29/822
[58] Field of Search ........................ 29/822, 823, 824

[56] References Cited

U.S. PATENT DOCUMENTS 4,698,904 10/1987 Nozalk et al. .................. 29/822 X

FOREIGN PATENT DOCUMENTS

115131 7/1984 Japan ...................................... 29/822

Primary Examiner—Timothy V. Eley
Attorney, Agent, or Firm—McGlew and Tuttle

[57] ABSTRACT

A rectangular guide way having side and end segments carry a plurality of pucks in each segment. The pucks have side edges parallel to the side segments and end edges parallel to the end segments so that the pucks ride smoothly along the guide way. The side and end segments are connected at corners where the pucks are transferred from guiding along the side edges in the side segments to guiding along the end edges in the end segments. A walking beam with a plurality of upwardly extending pins is moveable alone each of the segments. In an upper engagement position, the pins of the walking beam engage holes in each of the pucks in its segment. In this way all pucks are indexed an exact amount along each segment. A locking beam which is moveable only upwardly and downwardly may also be provided for firmly holding the pucks when the walking beams are disengaged therefrom.

20 Claims, 6 Drawing Sheets

ASSEMBLY MACHINE CHASSIS

FIELD AND BACKGROUND OF THE INVENTION

The present invention relates in general to automated assembling machines and in particular to a new and useful assembly machine chassis which is capable of accurately positioning and indexing objects to be moved along an automated assembly line.

In an automated assembly line, where objects are being assembled as they move from station to station along the line, it is important that each object be brought to an exact location at each station. It is also essential that each object be indexed by an exact distance from one station to the next. If an object is out of position at a particular station, an automatic piece of machinery which is meant to perform a certain operation may fail in its performance. The object may even be damaged or destroyed by the automatic machinery.

SUMMARY OF THE INVENTION

An object of the present invention is to provide an assembly machine chassis which is capable of moving objects by exact indexing lengths and from one precise location to the next along an assembly line.

To this end, the machine chassis includes a quadrangular guide way having opposite spaced apart side segments and opposite spaced apart end segments with four corners connected between the side and end segments. A plurality of pucks are slidably mounted along each of the segments of the guide way. Each puck is shaped so that it can slide between an end segment and a side segment at the corners of the guide way. Each puck has a site or nest for receiving an object. A walking beam is mounted for linear walking motion adjacent each of the segments, with each segment having its own walking beam. Each walking beam is movable from an engagement position where it engages all of pucks of its respective segment, and along its segment by an exact indexed length. In this way objects being held by the pucks are moved from one exact location to the next and by exact indexed lengths.

One or more translators are connected to each of the walking beams for moving them.

Another object of the invention is to provide the pucks each with a pair of spaced apart first edges extending parallel and slidable along side segments, and a pair of spaced apart second edges extending parallel to and sliding along the end segments. The length of the end segments are selected to be an integral number of widths of the pucks between their second edges while the lengths of the side segments are selected to be an integral number of lengths of the pucks between their first edges.

In this way, the plural pucks substantially fill the side and end segments. The pucks are made of self lubricating low wear material such as acetal resin or Nylatron nylon and molybdenum disulphide composition.

Another object of the invention is to provide each walking beam with a plurality of pins which closely fit within a single hole in each of the pucks. This fixes the relative position between each walking beam and its pucks.

According to the invention the pucks, and thus any objects held by the pucks, can be brought to a selected location with less than a 1,000th of an inch error.

Another object of the invention is to provide such an assembly machine chassis wherein a locking beam is moved synchronously with the walking beam and engages the pucks of a segment to hold the pucks at fixed locations, when the walking beams disengages from the pucks.

A still further object of the invention is to make the guide way rectangular with equal side segments and equal end segments. The machine chassis may be modular so that the overall length of the side segments can be varied by inserting or removing sections of the chassis.

A still further object of the invention is to provide an assembly machine chassis which is simple in design rugged in construction and economical to manufacture.

The various features of novelty which characterized the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
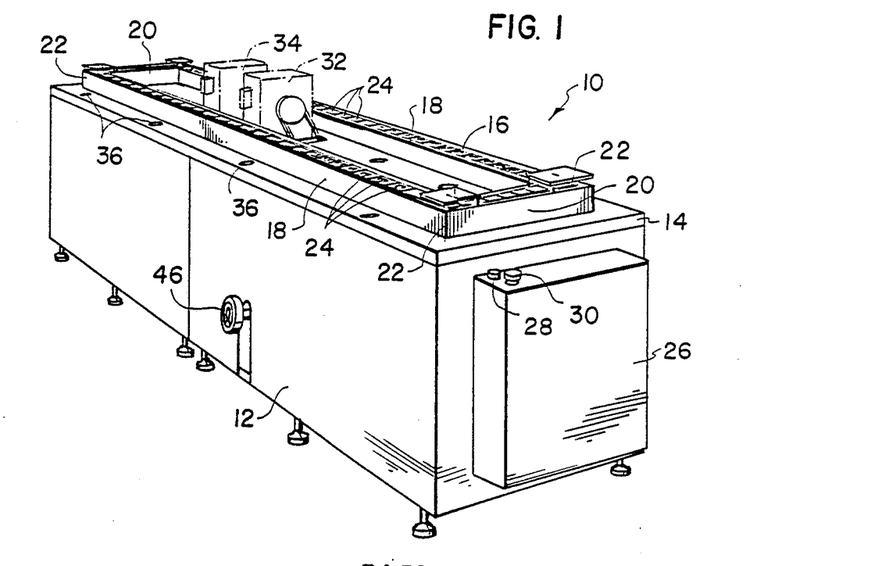
FIG. 1 is a perspective view of the assembly machine chassis in accordance with the invention.

Referring to the drawings in particular, the invention embodied in FIG. 1 comprises an assembly machine chassis generally designated 10 having a housing 12 which in FIG. 1 is shown with side panels enclosing the interior space of the housing. Housing 12 includes a top table 14 on which is mounted a quadrangular guide way 16. While in the embodiments illustrated, the guide ways are always rectangular, which term is used here to include square guide ways, it is understood that the guide ways may also be in the form of a parallelogram.

Figure 5:
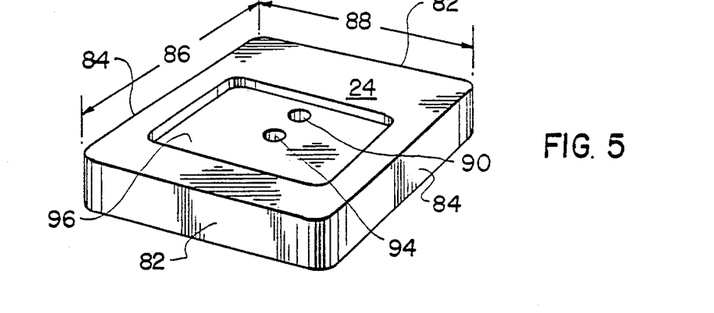
FIG. 5 is a perspective view of a puck shown on an enlarged scale which can be used either with the embodiment of FIGS. 1 through 4 which utilized only a walking beam, or another embodiment of the invention utilizing a walking and a locking beam.

Guide way 16 includes opposite spaced apart side segments 18 and opposite spaced apart end segments 20. The side and end segments are connected to each other at corners 22. A plurality of pucks 24 which are each rectangular and preferably square as shown in FIG. 5, are mounted for sliding movement along each of the segments 18, 20.

FIG. 1 also shows an electrical box 26 which can be mounted on housing 12 and which carries controls such as an on switch or button 28 and an off switch or button 30. FIG. 1 also shows a pair of automatically operating assembly machines 32 and 34 which, while not forming part of the present invention, can be bolted or otherwise fastened to table 14 at different stations or sites along the guide way 16, for performing various assembly operations on objects being carried by the pucks 24 and being indexed along and accurately positioned on the guide way 16 (see U.S. Pat. Nos. 3,751,996 and 3,881,362 to Beizer).

Covered access ports 36 are also evident in FIG. 1. These access ports can be uncovered to permit access through the table of the manipulating arms of various other assembly machines which may either be mounted on top of table 14 or under the table inside housing 12.

Figure 2:
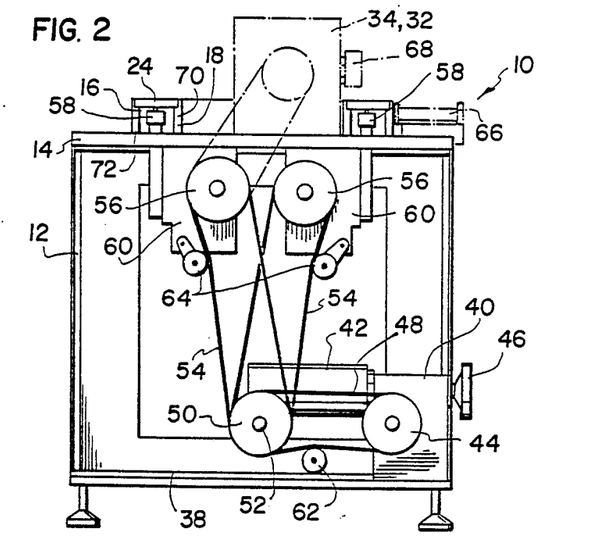
FIG. 2 is a side sectional view of the chassis shown in FIG. 1.

Turning now to FIG. 2, housing 12 of machine chassis 10 includes a floor 38 which carries a motor reducer 40 which is driven by a motor 42 to rotate a toothed pulley 44. Reducer 40 also carries a hand wheel 46 which is connected to the shaft of motor 42 so that the machine chassis can be cycled manually.

A toothed belt 48 is trained around pulley 44 and another pulley 50 which is keyed to a central drive shaft 52 which is rotatably mounted to the housing 12 above the floor 38.

Additional toothed belts 54 are trained around additional pulleys keyed to shaft 52. Each belt 54 is also trained around the toothed pulley 56 of a translator 60. Each of the translators 60 carries and moves a walking beam 58 in a movement path having vertical Y components and horizontal X components. Translator 60 may for example be the model T-400 translator manufactured and sold by Stelron Components, Inc. of New Jersey. Particular details of the translator 60 can also be found in U.S. Pat. No. 3,703,834 issued Nov. 28, 1972 to the inventor of the present application, which patent is incorporated here by reference.

To aide in maintaining the taughtness of the toothed belts 48 and 54, spring loaded pivotally mounted tensioning pulleys 62 and 64 are used.

Another auxiliary device which can be used in conjunction with the machine chassis 10, is a component conveyor 66 which carries components of an object to be assembled on the guide way 16, which components can be removed from conveyor 66 by an articulating arm 68 of one of the assembly machines 34.

As with assembly machine 34, component conveyor 66 does not form a part of the present invention.

FIG. 2 also includes a cross sectional view of the side segments 18 of guide way 16. Each guide way is formed of an inner upright wall 70 and an outer upright wall 72. Each of the walls 70 and 72 include near their upper edges, inwardly facing steps. These steps are spanned by a puck 24. Additional details concerning the configuration of the guide way and puck are provided later in this disclosure.

Figure 3:
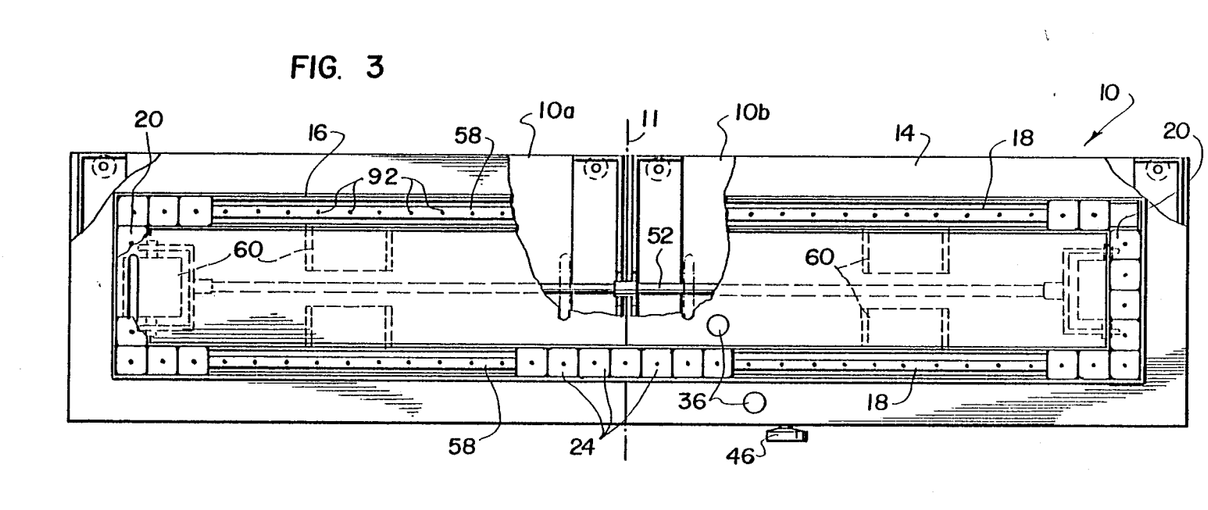
FIG. 3 is a top plan view of the chassis, with portions cut away for clarity and some of the pucks removed to expose the walking beams.

FIG. 3 better illustrates the quadrangular, preferably rectangular configuration for the guide way 16. Each of the side segments 18 has a single walking beam 58 which extends substantially the full length of its side segment. The number of pucks 24 is selected for each side segment so as to substantially fill the side segment except for the width of one puck. This permits each of the pucks in a side segment to be indexed by a length approximately equal to the width of the puck in a direction parallel to the side segment.

In likewise manner, the end segments 20 each include a single walking beam and carry one less puck than the number necessary to totally fill the end segment.

Due to the relative shortness of the end segments, a single translator 60 is sufficient at each end of the chassis 10 to move its respective walking beam. Due to the length of the side segments however a plurality, and preferably two or more translators 60 are connected to each of the walking beams 58 of the side segments. In this way the walking beams are firmly supported and moved in unison.

It is noted that the embodiment of FIG. 3 is made of two equally long and substantially mirror symmetrical sections 10a and 10b which are bolted together along a median plane 11. With this modular structure, additional central sections which consists only of side segments can be added between portions 10a and 10b to lengthen the machine chassis.

Shorter machine chassis can also be provided which are, for example, the effective length of only one of these sections 10a, or shorter. In these instances a single translator may be sufficient to move the walking beam of each segment of the quadrangular guide way.

Figure 4:
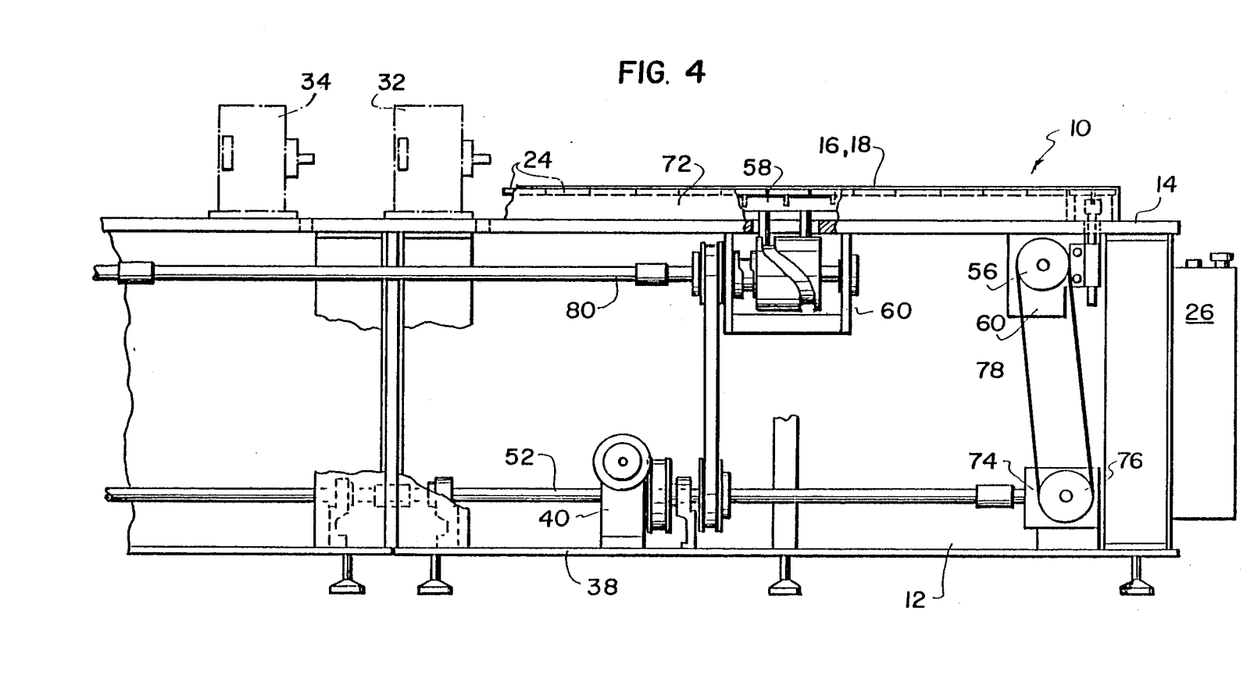
FIG. 4 is a partial side sectional view of the chassis shown on an enlarged scale with respect to FIG. 3.

FIG. 4, which is a partial side elevational view of the embodiment shown in FIGS. 1 through 3, shows a gear box 74 near the end of the housing 12 which carries a pulley 76 that is rotated by gears inside box 74 and by the drive shaft 52. A toothed belt 78 is trained around pulley 76 and the pulley 56 of the translator 60 at the end of the machine chassis 10.

To maintain synchronism between the translators 60 of the side segments 18, their pulleys are interconnected by a translator connecting shaft 80. In this way only one of the translators of the side segments need carry a drive pulley.

Turning to FIG. 5, one embodiment of the puck 24 is rectangular, and preferably square, with a pair of spaced apart first edges 82 which extend parallel to and are slidable along the walls of the side segments 18, and a pair of spaced apart second edges 84 which are parallel to and slidable along the walls of the end segments 20.

Each puck 24 has a first dimension 86 between the first edges 82 and a second dimension 88 between the second edges 84.

It is noted that the side segments 18 of the guide way 16 are selected to have a length corresponding to an integral number of second dimensions 88 while the end segment 20 have a length corresponding to an integral number of first dimensions 86.

Figure 6:
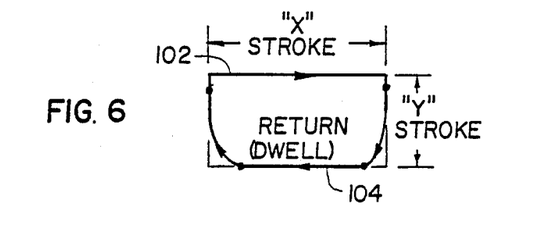
FIG. 6 is a movement diagram showing the movement of the walking beams.

Keeping in mind that each of the segments of the guide way carry one less puck than is necessary to completely fill the guide way, that is one less than total number to completely fill the entire machine, the walking beams, following the motion diagram of FIG. 6, and each engaged with every puck in its segment, move all the pucks by an indexing length which is substantially equal to the dimension of the puck which is parallel to that segment. When a puck at the end of a side segment reaches a corner 22 of the guide ways, it is engaged by the walking beam of an end segment and then, with its next indexing stroke, moves that puck by one indexing length (this time equal to the dimension of the puck parallel to the side segment) along the side segment.

According to a preferred embodiment of the invention, the walking beams at each of the four segments of the guide way move 90 degrees out of phase with the next segment around the guide way.

To ensure exact engagement between the walking beams and all the pucks in their respective segments, each of the pucks is provided with a retaining hole 90 that has a lower level entry end and into which an upstanding pin 92 (see FIG. 3) is engaged, when the walking beam is in its upper engagement position. Each walking beam has a sufficient number of pins 92 to engage the holes of every puck along its segment. The pins are spaced apart by distance substantially equal to the dimension of the puck parallel to that segment so that the pucks either touch each other or almost touch each other.

FIG. 5 also shows puck 24 to have a second hole 94 which is engagable by the pin of a locking beam which will be described in connection with the embodiments of FIGS. 9 through 11. Puck 24 is nevertheless usable with the embodiment of FIGS. 1 through 4 as long as the retaining hole 90 in a correct, and preferably central position, for being engaged by the pins 92 of the walking beams 58.

FIG. 5 also shows the top surface of puck 24 to contain a recess or nest 96 for retaining an object to be moved along the guide way. The nest should be substantially the same shape as the object to accurately hold the object on the puck. While a recess is shown, any other structure can be provided on puck 24 for holding an object at a fixed location on the puck.

FIG. 6 is a motion diagram for the movement of the walking beams 58. The X direction stroke is substantially the same as the dimension of the puck along the segment involved. Line 102 in the stroke diagram represents an upper engagement position for the walking beam when it is engaged with all of the pucks in its segments. The translators 60 are structured to then move their walking beams down along a Y stroke to disengage the walking beam from its pucks and to move it back in an opposite direction to the X stroke, back to the beginning point of the X stroke. This is represented by line or section 104 of the motion diagram in FIG. 6.

Figure 7:
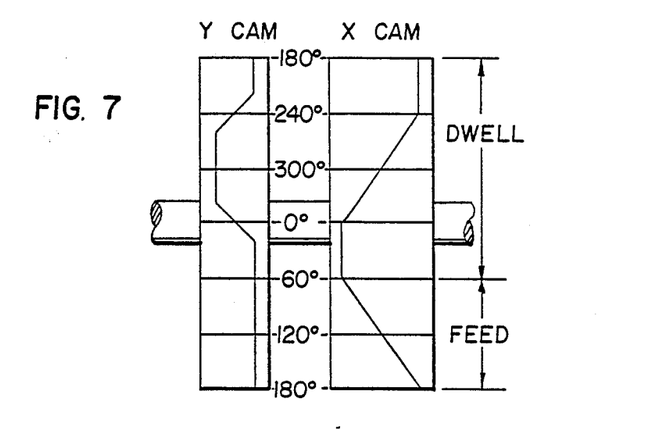
FIG. 7 is a schematic developmental view of the X and Y cams for translators used to move the walking beams.

FIG. 7 is a developed view of an X cam and a Y cam showing the contour of cam grooves that are used to move the actuating member of each translator, which is fixed to the walking beam. The section of the cams labelled DWELL represents the time at which the pucks are at a stand still in their respective segments. This time is approximately three times the length of the FEED section, during which the pucks are indexed or moved along the segment. During the DWELL time operations can be performed on object carried by the pucks.

Figures 8, 9:
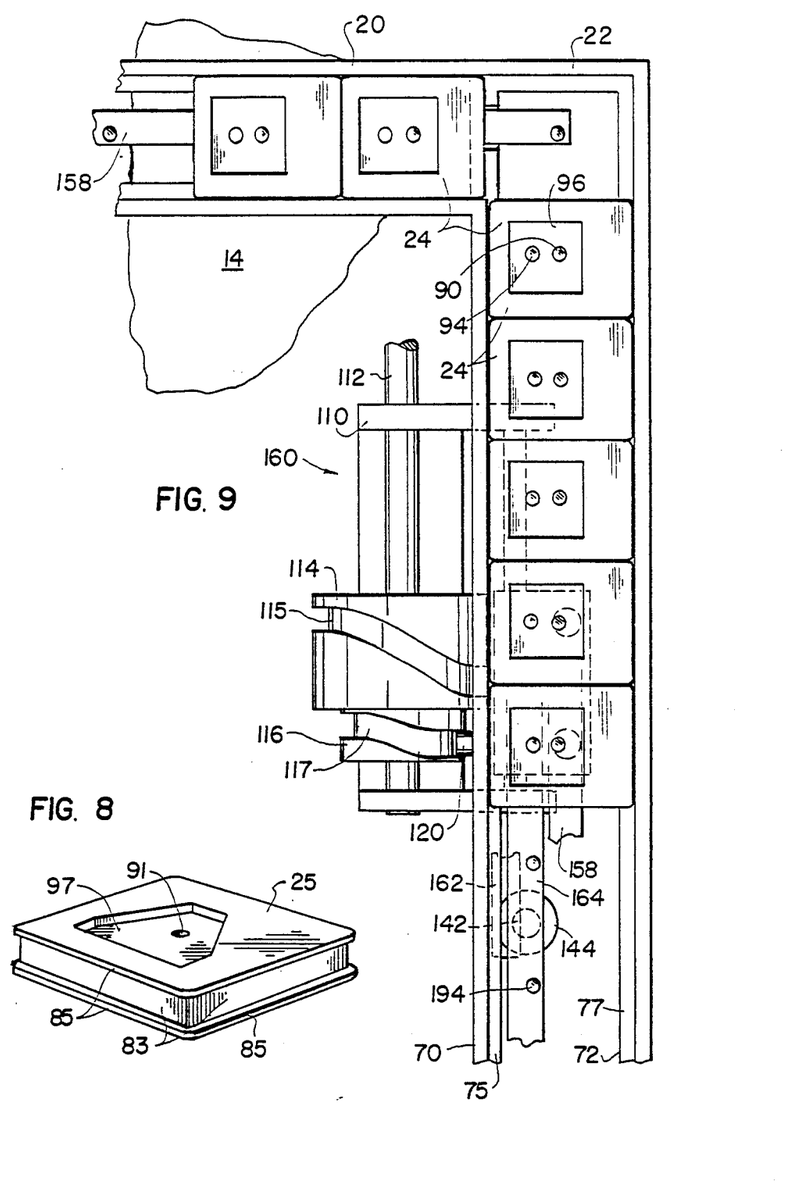
FIG. 8 is a view similar to FIG. 5 but showing another embodiment for the puck which is particularly useful in the embodiment of FIGS. 1 through 4 where no locking beam is utilized.
FIG. 9 is a partial top plan view of the corner area of an embodiment of the machine chassis using a walking beam and a locking beam.

FIG. 8 show an alternate embodiment for the puck 25 which has first and second edges that are each provided with a central groove 83 and have upper and lower flanges 85. Flanges 85 have the desired first and second dimensions for the puck 25. The provision of grooves 83 permits the pucks to expand and contract due to thermal influences, against each other. The relatively thin flanges e.g. 1/16th in., are sufficiently resilient so that even when the flange of one puck contacts the flange of an adjacent puck, some compression of the flange is possible to avoid binding of the pucks in the segment of the guide way. In this way, the dimensions of the pucks can be selected so that they touch each other along the guide way. If the temperature increases causing expansion of the pucks, this expansion is compensated for by a slight compression of the flanges 85.

FIG. 8 also shows the use of a single retaining hole 91 and a differently shaped recess or nest 97. The puck of FIG. 8 is advantageously used in the embodiment of FIGS. 1 through 4 where no locking beam is present. When the walking beam is out of engagement with the pucks, there is a possibility that the pucks may move on their own inside the guide way. To avoid this, pucks 25 each contact each other along the guide way, mutually holding their respective positions.

If however the puck of FIG. 5 is used in the embodiment of FIGS. 1 through 4, some small space must be left between the pucks to accommodate for expansion. Otherwise the pucks will expand against each other and possibly bind in the guide way.

With this slight amount of spacing, when the walking beams disengage from the pucks, there is a possibility that the pucks may move slightly. To avoid this, a locking beam is utilized as illustrated in the embodiment of FIGS. 9 through 11.

FIG. 9 shows a translator generally designated 160 which is similar to the translators 60 of FIGS. 1 through 4 but which includes an additional actuating arm 162 that pivots to move a locking beam 164 in a direction only upwardly and downwardly parallel to the Y stroke for the walking beam, shown at 158 in FIG. 9.

The components of translator 160 for moving the walking beam 158 in the movement direction shown in FIG. 6, are substantially the same as those for the translator 60 used in the embodiment of FIGS. 1 through 4. The following description is thus the same for both types of translators.

Figure 10:
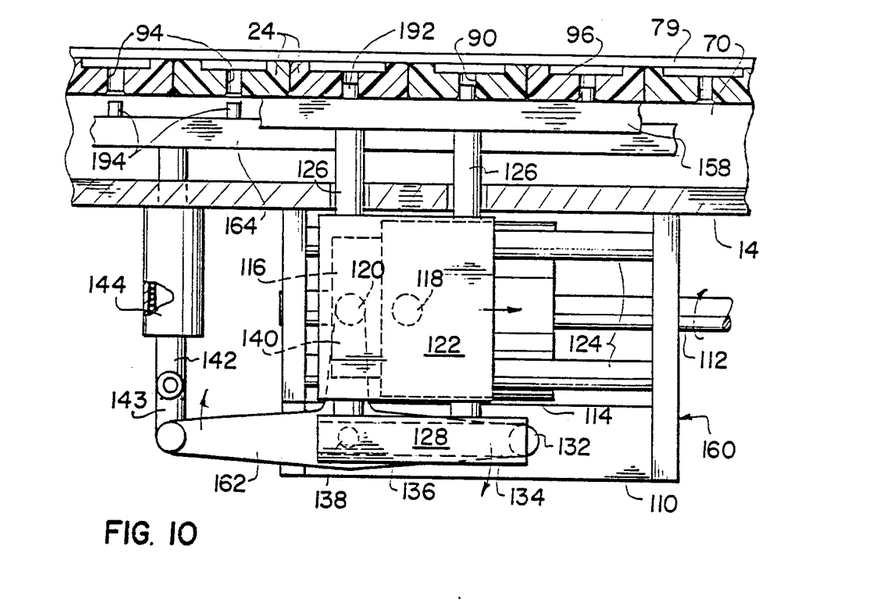
FIG. 10 is a side elevational view of the embodiment in FIG. 9.
Figure 11:
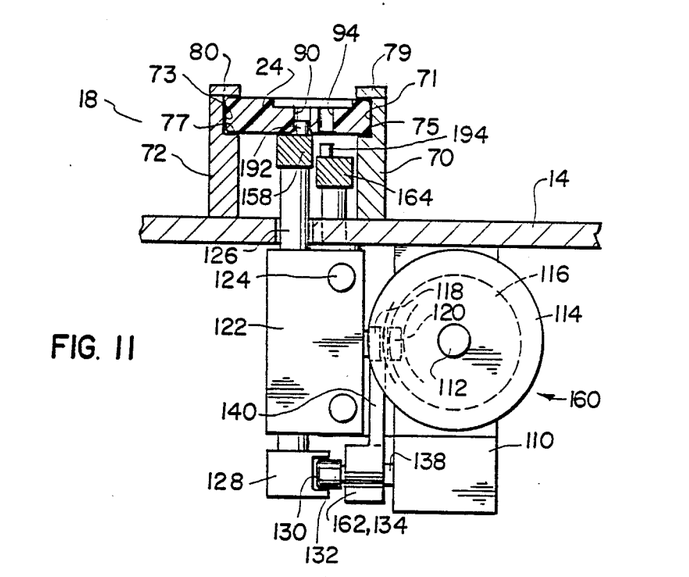
FIG. 11 is an end elevational view of the embodiment in FIG. 9.

Referring to FIGS. 9, 10 and 11, the translator 160 includes a frame 110 that rotatably supports a translator shaft 112. Translator shaft 112 is rotated by pulleys and toothed belts by a central drive shaft (substantially identical to drive shaft 52 and the embodiment of FIG. 2).

An X cam 114 and a Y cam 116 are keyed to the shaft 112 to be co-rotatable therewith.

Cam 114 has a cam groove 115 and cam 116 has a cam groove 117. A cam follower 118 is slidable along groove 115 and a cam follower 120 is slidable along groove 117.

A first slide block 122 is mounted for sliding in the X direction on slide rods 124 fixed to frame 110. Cam follower 118 is fixed to slide block 122 so that rotation of X cam 114 causes movement of block 122 back and forth in the X direction. Block 122 carries a pair of vertically movable slide rods 126. Slide rods 126 are mounted for movement in the Y or vertical direction. The walking beam 158 is fixed to the tops of rods 126.

The bottom of rods 126 are connected to a second slide block 128 which has a horizontally extending cam 130 which receives a cam follower 132. Cam follower 132 is connected to one arm 134 of a bell crank 136 that is mounted for rotation at pivot pin 138 to the frame 110. A second arm 140 of crank 136 carries at its upper end the cam follower 120 which rides in the groove of the Y cam 116. With rotation of cam 116, crank 136 pivots back and forth on its pivot pin 138 thus lifting and lowering the cam follower 132. This raises and lowers the slide rods 126 which in turn raise and lower the walking beam 158. Since however rods 126 slide in the first slide block 122, walking beam 158 also moves back and forth in the X horizontal direction. The motion diagram of FIG. 6 is thus followed by the walking beam 158.

The embodiment of FIGS. 9 through 11 differ from the embodiment of FIGS. 1 through 4 in that an additional arm 162 is connected to the crank 136. Additional arm 162 is connected to the bottom of an additional slide rod 142 through a pivoting link 143. Slide rode 142 is mounted for vertical Y direction movement in a linear bearing 144 connected under table 14. The top of rod 142 is connected to the locking beam 164 which can thus be made to move up and down with the rotation of shaft 112.

Since arms 134 and 162 extend in opposite directions with respect to pivot pin 138, the upward movement of locking beam 164 exactly corresponds the downward movement of walking bean 158. Thus, exactly when the pins 192 of walking beam 158 disengage a puck 24, the pins 194 of locking beam 164 engage the second hole 94 of the pucks.

In this way, each of the pucks at least in the side segments of the guide way are firmly held at all times.

Due to the relative short length of the end segments 20, no locking beam is necessary in the end segments. Thus only a walking beam 158 is provided at the end of the chassis.

FIG. 11 also shows, on a greatly enlarged scale, the configuration for the segments of the guide way. The inner and outer walls 70, 72 of the guide way 18 have inwardly facing edges 71 and 73 and upwardly facing step surfaces 75 and 77. The outer edges of puck 24 thus closely engaged the edges 71 and 73 and sit on the step surfaces 75 and 77. Retaining ledges or caps 79 and 80 are also provided over the step surfaces 75 and 77 to hold the pucks down on the guide way.

It is important the pucks be made of durable low wear material to maintain accuracy of positioning and indexing the pucks to within 1000th of an inch. An advantageous material for the pucks is know as DELRIN a trade name for a type of acetal resin, a form a thermal plastic, or Nylatron, and is available from Dupont, of Wilmington, Del.

It is also noted that while translators 60 and 160 are shown for moving the walking and/or locking beams, any other type of translator may be used to perform the same functions. For example a translator using stepping motors for moving the walking beams in a motion diagram shown in FIG. 6 maybe substituted.

While specific embodiments of the invention have been shown and described in detail to illustrate the application of the principles of the invention, it will be understood that the invention may be embodied otherwise without departing from such principles.

We claim:

1. An assembly machine chassis comprising: a quadrangular guide way having opposite spaced apart side segments and opposite spaced apart end segments with four corners connected between said side and end engagements: a plurality of pucks slidably mounted along each segment of said guide way, each puck having a site for receiving and holding an object to be moved along said guide way by an by indexed length, each puck being shaped so as to be movable at said corners between a side segments and an end segment; a walking beam mounted for linear walking motion parallel to an adjacent one of each said side and end segment, each walking beam having an engagement position engaged with respective said segment by one index length to move each puck in its associated said segment by one indexed length, each walking beam having a non engagement position spaced from each associated one of said pucks of its associated said segment; and translator means connected to each walking beam for moving each walking beam from its non-engagement position to its engagement position, then along its segment by one indexed length and then back to its non-engagement position.

2. An assembly machine chassis according to claim 1 wherein each of said pucks has a pair of spaced apart opposite first edges extending parallel to and slidable along said side segments, and a pair of spaced apart second opposite edges extending parallel to slidable along said end segments.

3. An assembly machine chassis according to claim 2 wherein each puck has a first dimension between its first edges and a second dimension between its second edges, each of said side segments being of an equal length which is equal to an integral multiple of said second dimension and each of said end segments being of an equal length which is equal to an integral multiple of said first dimension.

4. An assembly machine chassis according to claim 3 wherein, at all times, each of said segments carries one less than the number of pucks necessary to completely fill each segment.

5. An assembly machine chassis according to claim 3 wherein said guide way is rectangular, said side segments extending perpendicularly to said end segments, each of said pucks being rectangular.

6. An assembly machine according to claim 5 wherein each of said pucks is square with equal first and second edges.

7. An assembly machine chassis according to claim 5 wherein each of said segments comprises a pair of spaced apart walls having upper inwardly facing side edges and upwardly facing step surfaces, said pucks each resting on and spanning the space between said step surfaces with edges of said pucks engaging inwardly facing edges of said walls.

8. An assembly machine chassis according to claim 2 including a groove in each edge of each puck, said pucks being engaged against each other in said segments.

9. An assembly machine chassis according to claim 1 wherein each of said pucks includes a hole therein, each of said walking beams including a plurality of pins extending therefrom in a number equal to the number of pucks in a segment for said walking beam, said pins being insertable into said holes with said walking beam in its engagement position.

10. An assembly machine chassis according to claim 1 wherein each of said pucks has a recessed nest therein comprising said site for holding an object to said puck.

11. An assembly machine chassis according to claim 1 including a locking beam mounted for movement adjacent each of said segments, each walking beam being mounted for movement transversely to a longitudinal direction of its respected segment, said translator means being connected to each locking beam so that each locking beam is moveable out of engagement with pucks of its segment when the walking beam of that segment is movable into its engagement position, said locking beam being moveable into a locking position for engaging and holding all pucks in that segment when said walking beam is moved out of its engagement position.

12. An assembly machine chassis according to claim 11 wherein each puck includes two holes therein, each walking beam including a plurality of pins in a number equal to the number of pucks in its segment, each pin of said walking beam being engagable with one of said holes of each puck in said engagement position of said walking beam, said locking beam having a plurality of pins in a number equal to the number of pucks in its segment, each locking beam pin being engagable with the other hole of each puck in its segment.

13. An assembly machine chassis according to claim 1 wherein said translator means includes at least one separate translator for each segment, each separate translator connected to one of said walking beams, said translators of said segments each operating substantially 90 degrees out of phase with a subsequent segment around said guide way.

14. An assembly machine chassis according to claim 13 including a locking beam for each segment moveably mounted into an out of engagement with all pucks in said segment, each translator being connected to one walking beam and one locking beam and operating for synchronously moving said walking beams into their engagement position when said locking beams are moved out of engagement with the pucks, and for moving said walking beams out of their engagement position with movement of said locking beams into engagement with the pucks.

15. An assembly machine chassis according to claim 13 including a housing, a single drive unit mounted to said housing, a main drive shaft rotatably mounted to said housing and rotatable by said single drive unit, all of said translators being operatively connected to said drive shaft for moving said walking beams.

16. An assembly machine chassis according to claim 15 wherein said translators are connected to said main shaft for rotation 90 degrees out of phase with a next translator around said guide way.

17. An assembly apparatus device comprising a rectangular guideway having opposite parallel side segments which are equal in length to each other, and opposite parallel end segments which are equal in length to each other, said guideway including four corners interconnecting said side segments with said end segments, each of said side and end segments having facing guide edges, a plurality of rectangular pucks slidably mounted in each of said segments, each puck having a pair of spaced apart first edges extending parallel to and slidably engageable along said guide edges of said side segments, and a pair of spaced apart second edges parallel to and slidably engaged along said guide edges of said end segments, each puck having a nest for receiving and positioning an object to be moved around said guideway, each puck having a first dimension between its first edges and a second dimension between its second edges, the length of said side segments being equal to an integral number of said second dimensions and the length of said end segments being equal to an integral number of said first dimensions, each segment carrying one less than the number of pucks necessary to completely fill that segment, a walking beam for each segment, each walking beam being mounted for linear movement parallel to its associated one of said segments by an indexed length, each walking beam being engaged with all pucks in its associated one of said segments for moving all pucks along its segment by the indexed length, the indexed length being substantially equal to the dimension of one puck parallel to its segment, and at least one translator connected to each walking beam for moving each walking beam.

18. An apparatus according to claim 17 including a locking beam connected to each translator for movement and synchronism with said walking beam of that translator and engagable with all pucks in its segment, said translator moving the locking beam out of engagement with the pucks when the walking beam is moved into engagement with the pucks, and into engagement with the pucks when the walking beam is moved out of engagement with the pucks.

19. An apparatus according to claim 18 wherein each of said pucks has a pair of holes therein, each walking beam having a plurality of pins extending therefrom for engaging one hole of each puck in its segment, and each locking beam having a plurality of pins extending therefrom each for engaging the other hole of each puck in its segment.

20. An apparatus according to claim 17 including a groove in each edge of each puck, said pucks in each segment engaging each other along each segment.

* * * * *